(12) United States Patent  (10) Patent No.: US 8,239,610 B2
van Riel et al.  (45) Date of Patent: Aug. 7, 2012

(54) ASYNCHRONOUS PAGE FAULTS FOR VIRTUAL MACHINES

(75) Inventors: Henri H. van Riel, Merrimack, NH (US); Gleb Natapov, Herzliya (IL)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 12/608,324

(22) Filed: Oct. 29, 2009

(65) Prior Publication Data

US 2011/0107007 A1  May 5, 2011

(51) Int. Cl.
 *G06F 12/00* (2006.01)
(52) U.S. Cl. ............................. 711/6; 711/206
(58) Field of Classification Search ............... 711/6, 206
See application file for complete search history.

(56) References Cited

U.S. PATENT DOCUMENTS 7,716,446 B1 * 5/2010 Chen et al. .................... 711/170
2008/0178299 A1 * 7/2008 Merkle et al. ................... 726/29
2010/0229173 A1 * 9/2010 Subrahmanyam et al. ... 718/103

OTHER PUBLICATIONS

"PFAULT Macro—Page-Fault Handshaking Services". IBM Corporation. Feb. 16, 2010 <http://publib.boulder.ibm.com/infocenter/zvm/v5r4/index.jsp?topic=/com.ibm.zvm.v54.hcpb4/pfault.htm>.

* cited by examiner

*Primary Examiner* — Hashem Farrokh
(74) *Attorney, Agent, or Firm* — Lowenstein Sandler PC (57) ABSTRACT

A method and system to handle an asynchronous page fault in a virtual machine system. A computer hosts a virtual machine that includes a virtual central processing unit (CPU). The virtual CPU requests access to a page that is not resident in memory. The host operating system of the computer receives an indication of a page fault, and informs the virtual CPU of the page fault. The host operating system provides an identifier associated with the page fault. The host operating system performs page swapping operating in parallel with a new task rescheduled by the virtual CPU, and sends a wake-up signal to the virtual CPU when the page has been brought back into the memory.

21 Claims, 4 Drawing Sheets

ASYNCHRONOUS PAGE FAULTS FOR VIRTUAL MACHINES

TECHNICAL FIELD

Embodiments of the present invention relate to memory management, and more specifically, to the management of page faults in a virtual machine environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

A host computer can accommodate more virtual machines than the size of its physical memory allows. Using virtual memory techniques, the host computer can give each virtual machine the impression that it has a contiguous address space, while in fact the memory used by the virtual machine may be physically fragmented and even overflow to disk storage. Conventionally, when a virtual central processing unit (virtual CPU) in a virtual machine requests a page that is not present in the host computer memory, the entire virtual CPU is blocked by the page fault handler in the host operating system until the requested page is brought into the memory. The blocking of the virtual CPU can result in large latencies and unnecessary waste of system resources.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for handling an asynchronous page fault in a virtual machine system. In one embodiment, a computer hosts a virtual machine that includes a virtual central processing unit (CPU). The virtual CPU requests access to a page that is not resident in memory. The host operating system of the computer informs the virtual CPU of a page fault, which is associated with an identifier provided by the host operating system. The host operating system performs page swapping operating in parallel with a new task rescheduled by the virtual CPU, and sends a wake-up signal to the virtual CPU when the page has been brought back into the memory.

The term "page" herein refers to a memory unit (e.g., a 4K-byte block) in the addressable working space (also referred to as "virtual memory space") of a virtual machine. A page fault is raised when a program or a process in a virtual machine (also referred to as a "virtual CPU") attempts to access a page that is mapped in the address space, but is not resident in the physical memory. According to one embodiment of the invention, when a page fault is raised due to a user space, page cache or other process-specific page that is accessed by a virtual CPU, the same virtual CPU can continue handling interrupts or schedule other tasks while the host operating system fetches the missing page from disks. Thus, the page fault does not block the entire virtual CPU while the host operating system fetches the missing page. After the page is brought into the memory from the data storage, the host operating system sends a signal (e.g., a virtual interrupt) to the guest operating system, indicating that the process trying to access the page can continue to run.

Techniques described herein are applicable to personal computers in addition to other types of computing systems. Conventional personal computers do not have built-in software and hardware to support for non-blocking page faults. The capability of handling page faults asynchronously enables a personal computer to host virtual machines more efficiently.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
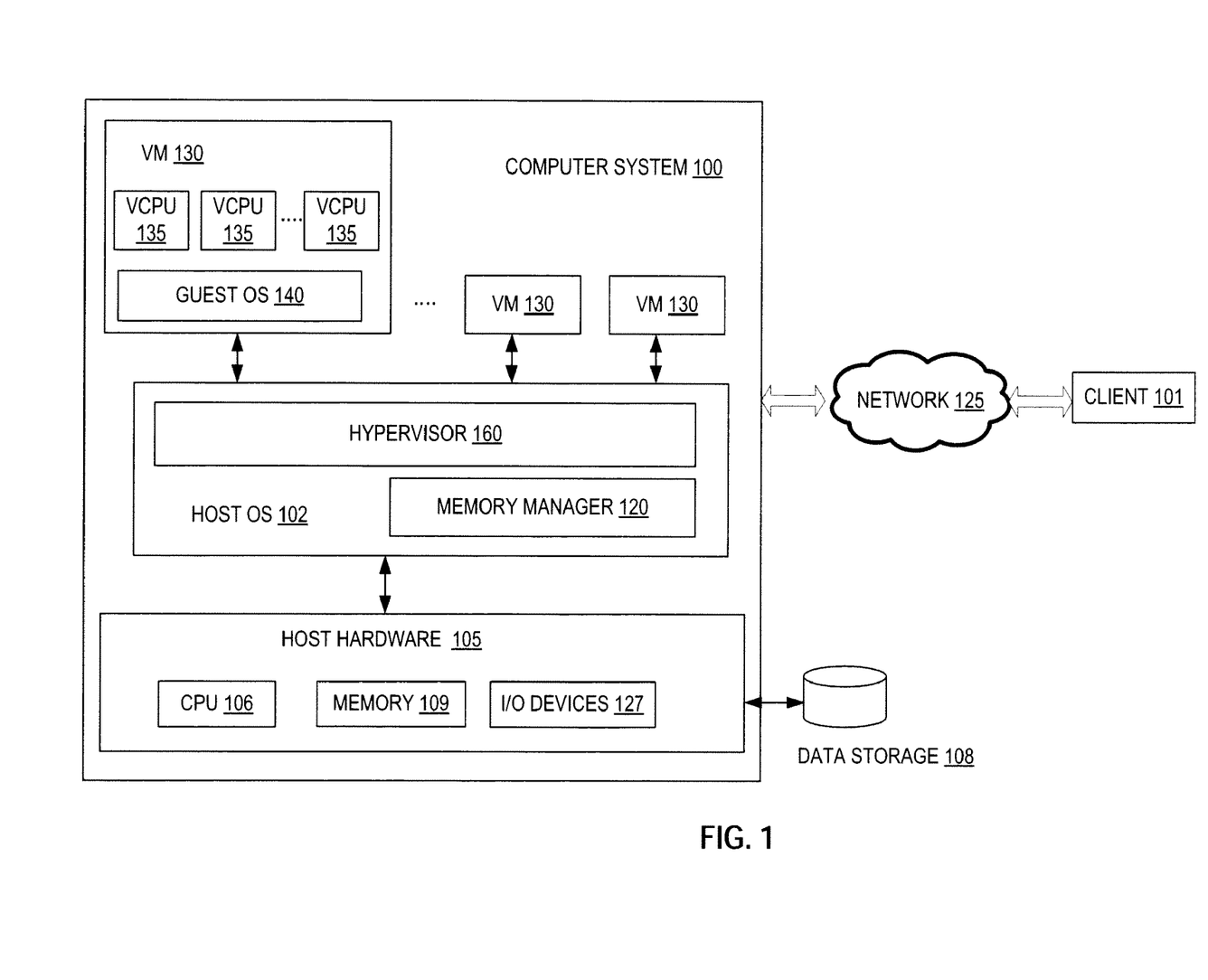
FIG. 1 is a block diagram of an exemplary architecture in which embodiments of the invention may be implemented.

FIG. 1 is a block diagram that illustrates an embodiment of a computer system 100 that hosts a plurality of virtual machines (VM) 130. Each virtual machine 130 may have multiple running virtual central processing units (virtual CPUs) 135. Each virtual machine 130 also runs a guest operating system (OS) 140 that has a process thread executed by a virtual CPU 135. Each virtual CPU 135 may handle multiple tasks and may schedule the execution of the tasks to improve efficiency. The computer system 100 may be a server, a workstation, a personal computer (PC), a mobile phone, a palm-sized computing device, a personal digital assistant (PDA), etc. In one embodiment, the computer system 100 is a PC implemented with x86 hardware.

The virtual machines 130 in the computer system 100 may have the same or different guest operating systems 140, such as Microsoft Windows, Linux, Solaris, etc. The computer system 100 may also run a host OS 102 to manage system resources, including access to memory 109, I/O devices 127 and data storage 108.

Each virtual machine 130 can execute operations for a remote client 101. The client 101 may be a computing system. The virtual machine 130 can be accessed by the client 101 over a network 125, such as a private network (e.g., a local area network (LAN), wide area network (WAN), intranet, etc.) or a public network (e.g., the Internet). In one scenario, each virtual machine 130 provides a virtual desktop for the client 101 and executes some or all of the graphics operations relating to the virtual desktop.

In one embodiment, the computer system 100 runs a hypervisor 160 to emulate underlying host hardware 105 for the virtual machines 130. The hypervisor 160 may also be known as a virtual machine monitor (VMM) or a kernel-based hypervisor. In some embodiments, the hypervisor 160 may be part of the host OS 102.

Host hardware 105 includes a central processing unit (CPU) 106, the memory 109 and other hardware components (e.g., the I/O devices 127). The host hardware 105 is also coupled to the data storage 108 via a direct connection or a local network. The memory 109 may include volatile memory devices (e.g., random access memory (RAM)), non-volatile memory devices (e.g., flash memory), and/or other types of memory devices. The data storage 108 may include mass storage devices, such as magnetic or optical storage based disks, tapes or hard drives.

According to one embodiment of the present invention, the host OS 102 includes a memory manager 120 that manages virtual memory used by the virtual machines 130. The memory manager 120 uses page fault code to handle asynchronous page fault. A page fault occurs when a page requested by the guest OS 140 is not resident in memory. The page fault code fetches the requested page and handles page swapping. In one embodiment, the page fault code is applicable to both synchronous page fault and asynchronous page fault, in a virtualized or non-virtualized environment. However, in contrast to a synchronous page fault where an entire virtual CPU 135 is suspended while waiting for the requested page being brought into the memory, the asynchronous page fault allows the virtual CPU 135 to reschedule another task for execution before the requested page is brought into the memory. The memory manager 120 may check a registered status of the virtual CPU 135 to confirm that the virtual CPU 135 supports asynchronous page faults, and send the virtual CPU 135 an exception indicating that an asynchronous page fault has occurred. The memory manager 120 also communicates with the virtual CPUs 135 using a designated space (e.g., memory or registers) which both the host OS 102 and the guest OS 140 can access. The designated space may also store the state of the virtual CPUs 135 and other information of the pages used by each virtual machine 130. The designated space is used by the host OS 102 and the guest OS 140 to communicate with each other with respect to the handling of page faults.

Figure 2:
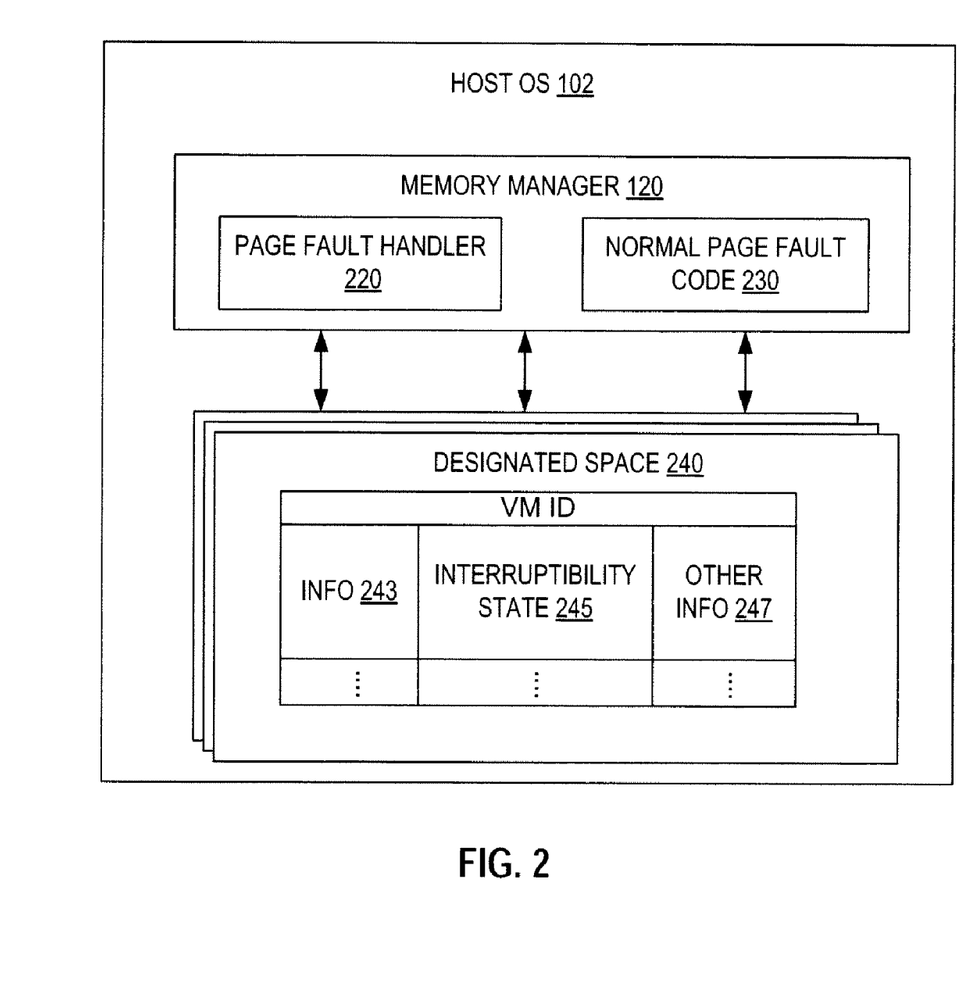
FIG. 2 is a block diagram of one embodiment of a memory manager in a host operating system that manages the memory usage of virtual machines.

FIG. 2 is a block diagram of one embodiment of the memory manager 120 in the host OS 102. The memory manager 120 includes a page fault handler 220, which handles both synchronous page faults and asynchronous page faults using the same page fault code 230. The memory manager 120 interacts with the guest OS 140 by sending signals (e.g., exceptions and interrupts) to the guest OS 140, and by passing information pertinent to page faults using a designated space 240. The designated space 240 can be a shared memory area or one or more designated virtual CPU registers. A virtual CPU register is a storage space allocated to a virtual CPU 135, and can be used by the virtual CPU 135 as registers. Both the host OS 102 and the guest OS 140 can access the designated space 240. In one embodiment, the designated space 240 is writable by both the host OS 102 and the guest OS 140. In another embodiment, a first portion of the designated space 240 may be writable by the host OS 102 and readable by the guest OS 140, and a second portion of the designated space 240 may be writable by the guest OS 140 and readable by the host OS 102. In one embodiment, the guest OS 140 can directly read the data written by the host OS 102 in the designated space 240. In an alternative embodiment, the guest OS 140 may send a read request to the host OS 102, which then provides the data to the guest OS 140.

In one embodiment, the location of the designated space 240 can be requested by the guest OS 140 and registered with the host OS 102. In alternative embodiments, the location can be determined by the host OS 102. Each virtual machine 130 may be associated with a different designated space 240. For simplicity of discussion, the following description will use one virtual machine and its guest OS 140 as an example. It is understood that the same principle can be applied to the other virtual machines 130 in the computer system 100.

In one embodiment, the designated space 240 of a virtual machine 130 stores information 243 regarding all of the pages used by the virtual machine 130. For example, the information 243 may include the address of each page and whether the page is currently resident in the memory. The host OS 102 can update the information 243 when a page is swapped in or swapped out of the memory. Alternatively, the information 243 may contain a small number of bytes, which indicate the address of a page that is requested by a virtual CPU 135 but is not resident in the memory. This address may be supplied by the host OS 102 to the guest OS 140. In another embodiment, the information 243 may contain an identifier of the task that is attempting to access a non-resident page. This identifier may be supplied by the guest OS 140 to the host 102.

In one embodiment, the designated space 240 may also store an interruptibility state 245 of each virtual CPU 135 in the virtual machine 130. A virtual CPU may block interrupts when it is engaged in a task that cannot be interrupted, or when it otherwise cannot reschedule another task at the occurrence of an interrupt. Virtualization software hosted by the computer system 100 may update the interruptibility state 245 of each virtual CPU 135 associated with the guest OS 140. When the interruptibility state 245 of a virtual CPU 135 is set, the host OS 102 will not send a page fault signal to the guest OS 140 and will handle the page fault synchronously. The host OS 102 handles a page fault synchronously by forcefully suspending the execution of the virtual CPU, until the page requested by the virtual CPU is brought back into memory. In an alternative embodiment, the interruptibility state 245 may be stored separately from the information 243 and 247 in a location separate from the designated space 240. The guest OS 140 may have permission to write into this location, and the host OS 102 may have permission to read from this location. It is not necessary for the guest OS 140 to read the interruptibility state 245 from this location.

The designated space 240 may also store other information 247 to facilitate the communication between the host OS 102 and the guest OS 140. For example, the host OS 102 may indicate that a current page fault is asynchronous by setting a flag or other indicators in the designated space 240.

Figure 3:
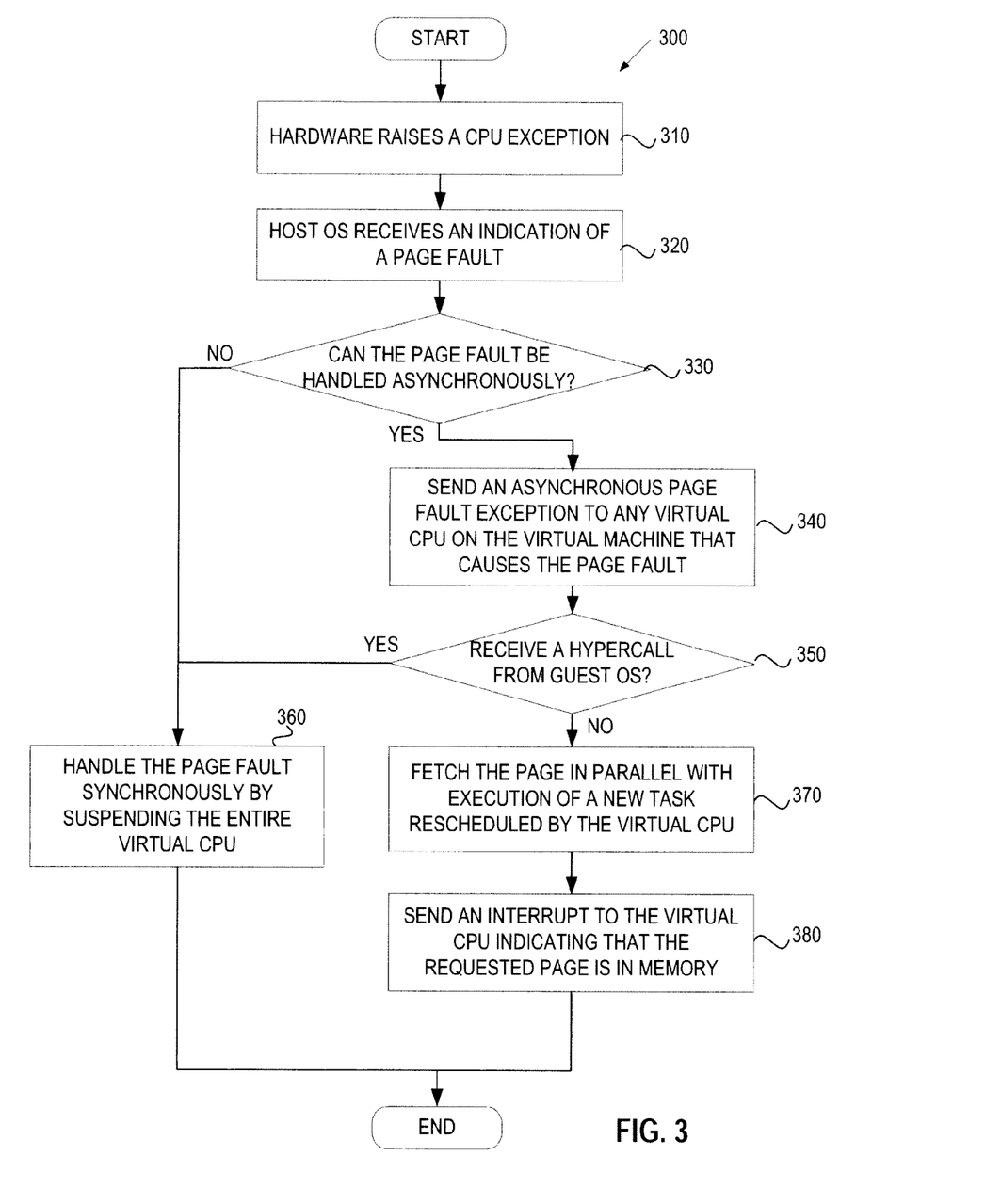
FIG. 3 is a flow diagram of one embodiment of a method for handling a page fault asynchronously.

FIG. 3 is a flow diagram illustrating one embodiment of a method 300 for handling a page fault asynchronously. The method 300 may be performed by a computer system 400 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the host OS 102 of FIGS. 1 and 2. In one embodiment, the method 300 is performed by the memory manager 120 in the host OS 102.

Referring to FIG. 3, in one embodiment, the method 300 begins when the computer hardware raises a CPU exception in response to a currently running program that is trying to access a non-resident page in its address space (block 310). The CPU exception is received by the host OS 102 as an indication of a page fault (block 320). The host OS 102 then determines whether the page fault can be handled asynchronously (block 330). A page fault cannot be handled asynchronously in a number of scenarios. For example, if the virtual CPU 135 has faulted on the same page twice, the host OS 102 may infer that the virtual CPU 135 cannot make progress with respect to rescheduling of another task. Therefore, the page fault will be handled synchronously. As another example, the virtual CPU 135 may have interrupts blocked. The host OS 102 may learn about the interruptibility state 245 of the virtual CPU by inspecting the designated space 240. If the virtual CPU 135 has interrupts blocked, the host OS 102 will not send an asynchronous page fault signal, because the signal will be blocked by the virtual CPU 135. In this scenario, the host OS 102 will handle the page fault synchronously. Additionally, the host OS 102 may handle a page fault asynchronously when the guest OS 140 is executing user space code (that is, the guest OS 140 is not running in the kernel mode). If the host OS 102 determines that the page fault cannot be handled asynchronously, the host OS 102 will handle the page fault synchronously by suspending the entire virtual CPU until the requested page is brought back into the memory (block 360).

In one embodiment, after the host OS 102 determines that the page fault can be handled asynchronously, the host OS 102 sends an asynchronous page fault exception to the virtual CPU 135 which causes the page fault (block 340). The asynchronous page fault exception indicates that "the process currently running on this virtual CPU is trying to access a page that is not resident." The asynchronous page fault exception may be in the form of a pre-defined exception vector that is understood by both the host OS 102 and the guest OS 140. In one embodiment, the host OS 102 and guest OS 140 can negotiate which exception vector is to be used to inform the guest OS 140 that it is trying to access a non-resident page. In response, the virtual CPU 135 will suspend the task that attempts to access the page, and reschedule another task for execution. This other task may be an active task or an idle task (i.e., the virtual CPU 135 may choose to be idle and perform no task). The guest OS 140 associates the suspended task with an identifier in the asynchronous page fault exception. The identifier may be part of the asynchronous page fault exception sent from the host OS 102, or may be passed to the guest OS 140 via the designated space 240. At a later wake-up time, the guest OS 140 will use the identifier to identify which of the suspended tasks (if there is more than one) is to be wakening up.

In one scenario, after the guest OS 140 receives the asynchronous page fault from the host OS 102, the guest OS 140 determines that it cannot reschedule tasks. One example is that the page containing the scheduler of the guest OS 140 has been swapped out of the memory. In this scenario, the guest OS 140 can make a hypercall to the host OS 102 after it receives an asynchronous page fault exception from the host OS 102. A hypercall is equivalent to a system call made by an application to access kernel resources. The hypercall sent by the guest OS 140 can indicate that the guest OS 140 cannot reschedule another task and will be waiting on the page fault synchronously. After receiving the hypercall (block 350), the host OS 102 will handle the page fault synchronously by suspending the entire virtual CPU until the requested page is brought back into the memory (block 360). In another scenario where the guest OS 102 is unable to make the hypercall and therefore is unable to inform the host OS 102 of its inability to reschedule, a virtual CPU associated with the guest OS 104 may fault on the same address twice. From the two faults, the host OS 102 can infer that the guest OS 102 cannot reschedule, and will handle the page fault synchronously.

After informing the guest OS 140 of the asynchronous page fault, the host 102 then handles the asynchronous page fault using the page fault code 230 to fetch the requested page into the memory (block 370). The page fetching operation can be performed in parallel with the task rescheduled for execution by the virtual CPU 135. Once the requested page is brought into the memory, the host 102 sends an interrupt (also referred to as a "wake-up" interrupt) to any virtual CPU 135 on the same virtual machine 130 that caused the page fault (block 380). The interrupt indicates that "the requested page has been brought into the memory from the backing data storage." In response, the virtual CPU 135 can wake up the suspended task to access the requested page. At any time during the above process, the guest OS 140 and the host OS 102 may modify the designated space 240 (or portions thereof) to reflect the current state of the virtual machine 130 and the pages used by the virtual machine 130.

In one embodiment, the asynchronous page fault exception and the wake-up interrupt contain, or are associated with, the same identifier. The identifier can be the address of the non-resident page that the virtual CPU 135 is accessing or a task ID for the task that is accessing the non-resident page. Alternatively, the identifier can be a random value, a value chosen from a number sequence, or any value that is chosen by the host OS 102 to be uniquely associated with a page fault event at any point of time. Upon receiving the wake-up interrupt, the guest OS 140 uses the identifier in the wake-up interrupt to identify which exception is associated with the interrupt. By associating the wake-up interrupt with a previously-received exception, the guest OS 140 is able to identify the task that needs to be waking up.

In one embodiment, the asynchronous page fault exception and the wake-up interrupt may be implemented as two tokens. The host OS 102 can send the two tokens to the virtual CPU 135 that causes the page fault. The tokens can be passed to the virtual CPU 135 via a designated memory location (e.g., one or more designated virtual CPU registers). As described above, the two tokens contain the same identifier, which can be a random value, a value chosen from a number sequence, or any other value that is uniquely associated with a page fault event at any point of time. The first token indicates to the virtual CPU 135 that the page being requested is not resident in the memory, and the second token indicates to the virtual CPU 135 that the requested page has been brought into the memory. Upon receiving the first token, the virtual CPU 135 suspends the task that is requesting the page and reschedules another task for execution. Upon receiving the second token, the virtual CPU 135 wakes up the suspended task to allow the task to access the requested page.

Some computing systems, such as personal computers, do not have the infrastructure or hardware support for the host OS 102 to know the ID of the tasks being suspended for page faults. Thus, in these computing systems, the host OS 102 can use any unique value as an identifier to uniquely associate a wake-up interrupt with its corresponding exception. The identifier may be sent to the guest OS 140 by using the exception and the interrupt, and/or may be communicated to the guest OS 140 by using the designated space 240.

Figure 4:
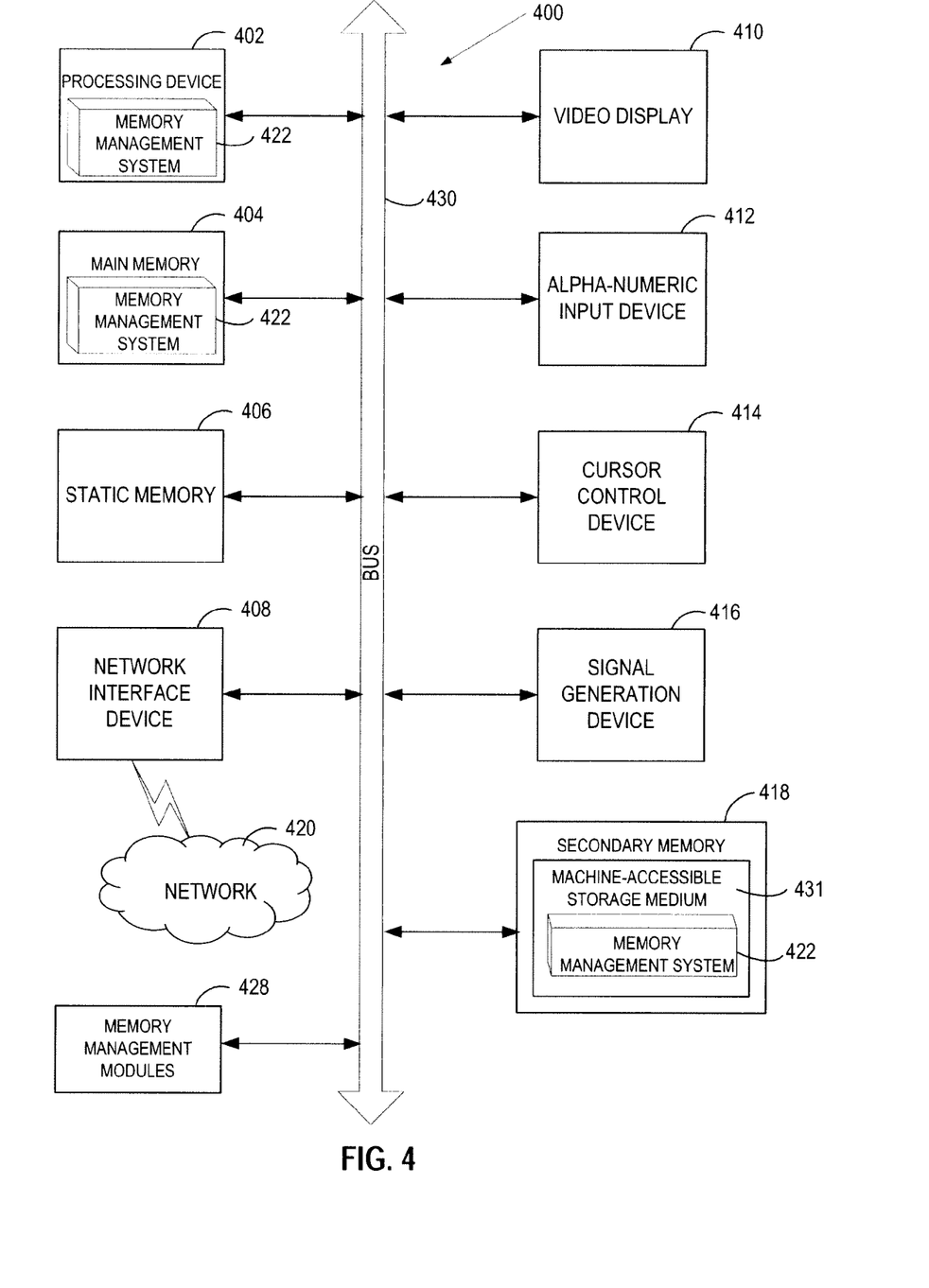
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., a memory management system 422) embodying any one or more of the methodologies or functions described herein (e.g., the memory manager 120 in the host operating system 102 of FIGS. 1 and 2). The memory management system 422 may also reside, completely or at least partially, within the main memory 404 and/or within the processing device 402 during execution thereof by the computer system 400; the main memory 404 and the processing device 402 also constituting machine-readable storage media. The memory management system 422 may further be transmitted or received over a network 420 via the network interface device 408.

The machine-readable storage medium 431 may also be used to store the memory management system 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 400 may additionally include memory management modules 428 for implementing the functionalities of the memory manager 102 in the host operating system 102 of FIGS. 1 and 2. The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "informing", "fetching", "sending", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer programmed to perform the following, comprising:
   receiving, by the computer, an indication of a page fault, the page fault caused by a virtual central processing unit (CPU) accessing a page not resident in a memory, the virtual CPU associated with a virtual machine hosted by the computer;
   informing the virtual CPU of the page fault, the page fault being associated with an identifier provided by a host operating system of the computer;
   fetching the page from a data storage in parallel with execution of a new task by the virtual CPU, the new task rescheduled by the virtual CPU in response to the page fault; and
   sending a wake-up signal to the virtual CPU, the wake up signal being associated with the identifier and indicating that the page has been brought into the memory.

2. The method of claim 1, wherein the computer is a personal computer that hosts a plurality of virtual machines.

3. The method of claim 1, further comprising:
   passing information relating to the page between a guest operating system of the virtual machine and the host operating system via a shared memory area.

4. The method of claim 3, wherein at least a first portion of the shared memory area is writable by the guest operating system of the virtual machine and at least a second portion of the shared memory area is writable by the host operating system.

5. The method of claim 1, further comprising:
   reading an interruptibility state of the virtual CPU to determine whether the virtual CPU can be interrupted;
   in response to a determination that the virtual CPU can be interrupted, fetching the page from the data storage in parallel with execution of the new task by the virtual CPU; and
   in response to a determination that the virtual CPU cannot be interrupted, fetching the page from the data storage and suspending the virtual CPU.

6. The method of claim 1, wherein the new task comprises an idle task.

7. The method of claim 1, further comprising:
   passing information relating to the page between a guest operating system of the virtual machine and the host operating system via one or more virtual CPU registers.

8. The method of claim 1, further comprising:
   receiving an indication that the virtual CPU has faulted on a same page address twice; and
   suspending the virtual CPU until the page is brought into the memory.

9. The method of claim 1, further comprising:
   receiving a hypercall from a guest operating system of the virtual machine, the hypercall indicating that the guest operating system cannot reschedule; and
   suspending the virtual CPU until the page is brought into the memory.

10. A system comprising:
    a data storage; and
    a computer coupled to the data storage to host a plurality of virtual machines, the computer comprising:
    a memory to store pages used by the virtual machines; and
    a processor to run a host operating system for the computer and a guest operating system for each virtual machine, the host operating system to:
    receive an indication of a page fault, the page fault caused by a virtual central processing unit (CPU) of one of the virtual machines that attempts to access a page not resident in the memory;
    inform the virtual CPU of the page fault, the page fault associated with an identifier provided by the host operating system;
    fetch the page from the data storage in parallel with execution of a new task by the virtual CPU, the new task rescheduled by the virtual CPU in response to the page fault; and
    send a wake-up signal to the virtual CPU, the wake up signal associated with the identifier to indicate that the page has been brought into the memory.

11. The system of claim 10, wherein the computer is a personal computer.

12. The system of claim 10, wherein information relating to the page is passed between the guest operating system and the host operating system via a shared memory area or one or more virtual CPU registers.

13. The system of claim 10, wherein the new task comprises an idle task.

14. The system of claim 10, wherein the computer stores an interruptibility state of each of a plurality of virtual CPUs associated with the virtual machines.

15. A computer readable storage medium including instructions that, when executed by a processing system, cause the processing system to perform a method comprising:
    receiving an indication of a page fault, the page fault caused by a virtual central processing unit (CPU) accessing a page not resident in memory, the virtual CPU associated with a virtual machine hosted by a computer;
    informing the virtual CPU of the page fault, the page fault being associated with an identifier provided by a host operating system of the computer;
    fetching the page from a data storage in parallel with execution of a new task by the virtual CPU, the new task rescheduled by the virtual CPU in response to the page fault; and
    sending a wake-up signal to the virtual CPU, the wake up signal being associated with the identifier and indicating that the page has been brought into the memory.

16. The computer readable storage medium of claim 15, wherein the method further comprises:
    passing information relating to the page between a guest operating system of the virtual machine and the host operating system via a shared memory area or one or more virtual CPU registers.

17. The computer readable storage medium of claim 15, wherein the method further comprises:
    reading an interruptibility state of the virtual CPU to determine whether the virtual CPU can be interrupted;
    in response to a determination that the virtual CPU can be interrupted, fetching the page from the data storage in parallel with execution of the new task by the virtual CPU; and
    in response to a determination that the virtual CPU cannot be interrupted, fetching the page from the data storage and suspending the virtual CPU.

18. The computer readable storage medium of claim 15, further comprising:

determining whether a guest operating system of the virtual machine is executing user space code; and in response to a determination that the guest operating system is executing the user space code, informing the virtual CPU of the page fault.

19. The computer readable storage medium of claim 15, further comprising:

receiving an indication that the virtual CPU has faulted on a same page address twice; and suspending the virtual CPU until the page is brought into the memory.

20. The computer readable storage medium of claim 15, further comprising:

receiving a hypercall from a guest operating system of the virtual machine, the hypercall indicating that the guest operating system cannot reschedule; and suspending the virtual CPU until the page is brought into the memory.

21. The computer readable storage medium of claim 15, wherein the new task comprises an idle task.

* * * * *